United States Patent
Meschkat

(10) Patent No.: US 9,158,748 B2
(45) Date of Patent: Oct. 13, 2015

(54) CORRECTION OF QUOTATIONS COPIED FROM ELECTRONIC DOCUMENTS

(75) Inventor: Steffen Meschkat, Zurich (CH)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 13/402,470

(22) Filed: Feb. 22, 2012

(65) Prior Publication Data
US 2015/0193413 A1 Jul. 9, 2015

(51) Int. Cl.
*G06F 17/00* (2006.01)
*G06F 17/24* (2006.01)
*G06F 17/11* (2006.01)

(52) U.S. Cl.
CPC .................................... *G06F 17/241* (2013.01)

(58) Field of Classification Search
CPC ........................................................ G06F 17/24
USPC ........................................................ 715/230
See application file for complete search history.

(56) References Cited

U.S. PATENT DOCUMENTS

| | | | | |
|---|---|---|---|---|
| 8,170,868 | B2* | 5/2012 | Gamon et al. | 704/9 |
| 8,386,478 | B2* | 2/2013 | Wang | 707/723 |
| 8,719,008 | B2* | 5/2014 | Kinder | 704/9 |
| 2006/0123329 | A1* | 6/2006 | Steen et al. | 715/500 |
| 2006/0224570 | A1* | 10/2006 | Quiroga et al. | 707/3 |
| 2011/0047457 | A1* | 2/2011 | Flint et al. | 715/261 |
| 2011/0107206 | A1* | 5/2011 | Walsh et al. | 715/256 |
| 2011/0238663 | A1* | 9/2011 | Zhang | 707/736 |
| 2011/0295593 | A1* | 12/2011 | Raghuveer | 704/9 |
| 2013/0097490 | A1* | 4/2013 | Kotler et al. | 715/255 |
| 2013/0103387 | A1* | 4/2013 | Kinder | 704/9 |

OTHER PUBLICATIONS

Hashemi, Sylvana, "Ambigity Resolution by Reording Rules in Text Containing Errors", 2007, Assocoation for Computational Linguistics, pp. 69-70.*
Callaway et al., "Pronominalization in Generated Discourse and Dialogue", ACL, 2002; pp. 88-95.*
Girju et al., "Support Vector Machines Applied to the Classification of Semantic Relations in Norminalized Noun Phrases", ACM, 2004, pp. 1-8.*

* cited by examiner

*Primary Examiner* — James J Debrow
(74) *Attorney, Agent, or Firm* — Ropes & Gray LLP

(57) ABSTRACT

A method of annotating an electronic document includes generating a first annotation in a first electronic document using an annotation service, where the first annotation makes a first correction to a portion of text based on the context of the portion of text within the first electronic document. The method further includes storing the first annotation in the metadata of the first electronic document, detecting electronic copying of the portion of text to a copy buffer, and correcting the portion of text in the copy buffer according to the first annotation.

27 Claims, 3 Drawing Sheets

CORRECTION OF QUOTATIONS COPIED FROM ELECTRONIC DOCUMENTS

FIELD OF THE DISCLOSURE

The present disclosure relates generally to document processing and in particular to correcting quotations copied from an electronic document.

BACKGROUND

One of the most commonly used functions in electronic document processing is copy and paste, where a user copies text from one document and pastes the copied text into another document. Sometimes, the copied text is used as a quotation in the document where it has been pasted. However, semantic or syntax problems may arise when copying text from one document to another verbatim. For example, the copied text may contain pronouns or acronyms that are defined in the original document but not in the document in which it is being copied. When it is pasted in the new document, the copied text may be missing the necessary context to be easily understandable. Another example is when a portion of a sentence is copied and pasted. The ordering and tense of words may have to be changed for the pasted text to be syntactically correct. Copy and paste functions generally cannot change the text that is copied before it is pasted so the user must manually edit the text after pasting it to correct syntax errors and make the text more understandable.

SUMMARY

An aspect described herein discloses a method of correcting quotations copied from an electronic document. The method includes receiving a selection of a portion of text that is electronically copied from a first electronic document and generating a first annotation from the portion of text using an annotation service, where the first annotation makes a correction to the portion of text based on the context of the portion of text within the first electronic document. The method further includes presenting the first annotation to a first user for approval.

Another aspect described herein discloses a method of annotating an electronic document. The method includes generating a first annotation in a first electronic document using an annotation service, where the first annotation makes a first correction to a portion of text based on the context of the portion of text within the first electronic document. The method further includes storing the first annotation in the metadata of the first electronic document, detecting an electronic copying of the portion of text to a copy buffer, and correcting the portion of text in the copy buffer according to the first annotation.

Another aspect described herein discloses an apparatus for accessing electronic documents. The apparatus includes a server computer storing a plurality of electronic documents and a plurality of client computers that can view the plurality of electronic documents stored on the host server and can copy text from the plurality of electronic documents. The apparatus further includes an annotation service, where the annotation service generates a first annotation correcting a portion of text in a first electronic document, where the first annotation is based on the context of the portion of text within the first electronic document, and makes the first annotation available to a first client computer in the plurality of client computers when the first client computer copies the portion of text.

Another aspect described herein discloses a non-transitory computer readable medium storing computer executable instructions, which, when executed by a processor, cause the processor to carry out a method for annotating an electronic document. The non-transitory computer readable medium includes instructions to generate a first annotation in a first electronic document, where the first annotation makes a first correction to a portion of text based on the context of the portion of text within the first electronic document. The non-transitory computer readable medium also includes instructions to store the first annotation in the metadata of the first electronic document, instructions to detect an electronic copying of the portion of text to a copy buffer, and instructions to correct the portion of text in the copy buffer according to the first annotation.

BRIEF DESCRIPTION OF THE DRAWINGS

The systems and methods may be better understood from the following illustrative description with reference to the following drawings in which.

DETAILED DESCRIPTION

To provide an overall understanding of the systems and methods described herein, certain illustrative implementations will now be described, including systems and methods for correcting quotations copied from an electronic document. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
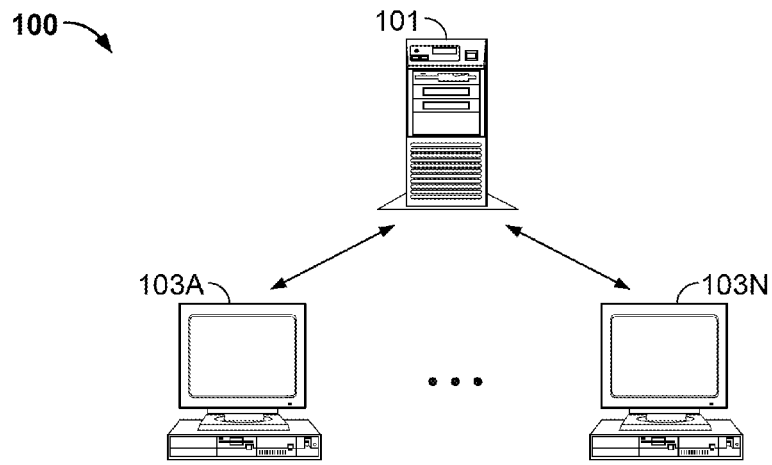
FIG. 1 shows a client-server system in accordance with an implementation as described herein.

In order to describe systems and methods for correcting quotations copied from an electronic document, a general client-server system is first described. FIG. 1 shows a client-server system 100 that includes a server 101 and client computers 103A through 103N. Client-server system 100 may include multiple servers connected to client computers 103A through 103N. Server 101 can provide different services to client computers 103A through 103N. For example, server 101 may be a web-hosting server that provides web page content to display in a web browser running on the client computers 103A through 103N. In another example, server 101 provides online document processing and storage services. The client computers 103A through 103N can access and edit word processing documents, spreadsheets, presentations, and other documents stored on server 101. Server 101 may allow client computers 103A through 103N to access or edit certain documents stored on server 101. In another example, server 101 may provide client computers 103A through 103N access to content stored in a database. In these examples, client computers 103A through 103N have the ability to copy text stored on server 101 and paste the text onto a document stored on the client computer. For example, a user on client computer 103A may communicate with server 101 to access a word processing document stored on server 101. The user can then copy text within the document and paste the text into another document that is stored on client computer 103A.

Figure 2:
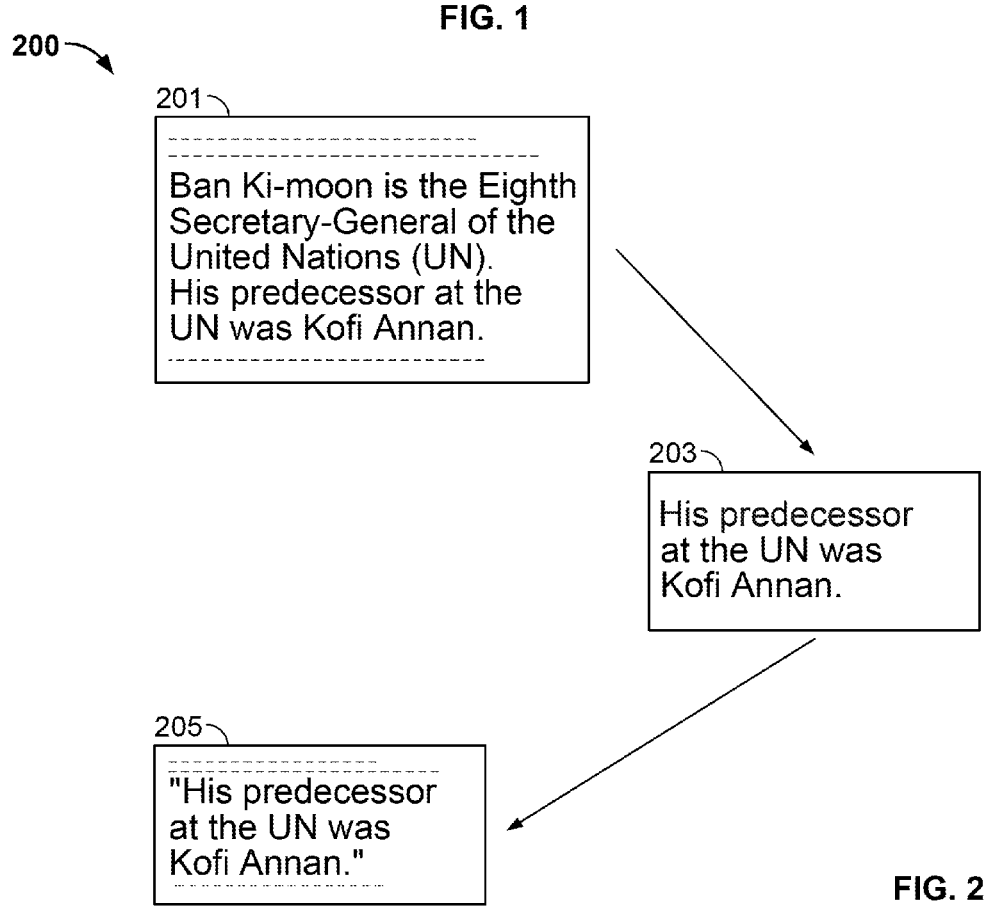
FIG. 2 shows a method of copying and pasting text in accordance with an implementation as described herein.

General methods of copying and pasting text are now described. FIG. 2 shows a method 200 of copying and pasting text from one electronic document to another electronic document. Document 201 is an electronic document such as a word processing document, web page, spreadsheet, presentation, or other similar document. Document 201 may be stored on a server and accessed by one or more client computers, similar to client-server system 100 illustrated in FIG. 1. Document 201 contains a portion of text: "Ban Ki-moon is the Eighth Secretary-General of the United Nations. His predecessor at the UN was Kofi Annan." The second sentence in the text contains a pronoun ("His", referring to Ban Ki-moon) and an acronym ("UN", referring to the United Nations). The first sentence of the text defines the pronoun and the acronym.

A user on a client computer can copy text from document 201. For example, the second sentence from the portion of text can be copied. When the copy function is invoked, the text is stored on a buffer, or a clipboard, on the client computer. The clipboard is commonly a part of the operating system of the client computer and can store text and other data copied from any application running on the client computer. In FIG. 2, clipboard 203 on the client computer contains the second sentence of the portion of text from document 201 after it has been copied. The user can then paste what has been copied into another document 205 on the client computer.

The sentence "His predecessor at the UN was Kofi Annan" now is part of document 205. However, because the first sentence of the portion of text in document 201 was never copied and pasted, the context of the copied text may be unclear. For example, a person reading document 205 may not know the noun that the pronoun "His" refers to or may not know the meaning of the acronym "UN." To clarify the pasted text, the user must manually edit the copied text or the text surrounding the copied text to provide the necessary context.

Figure 3:
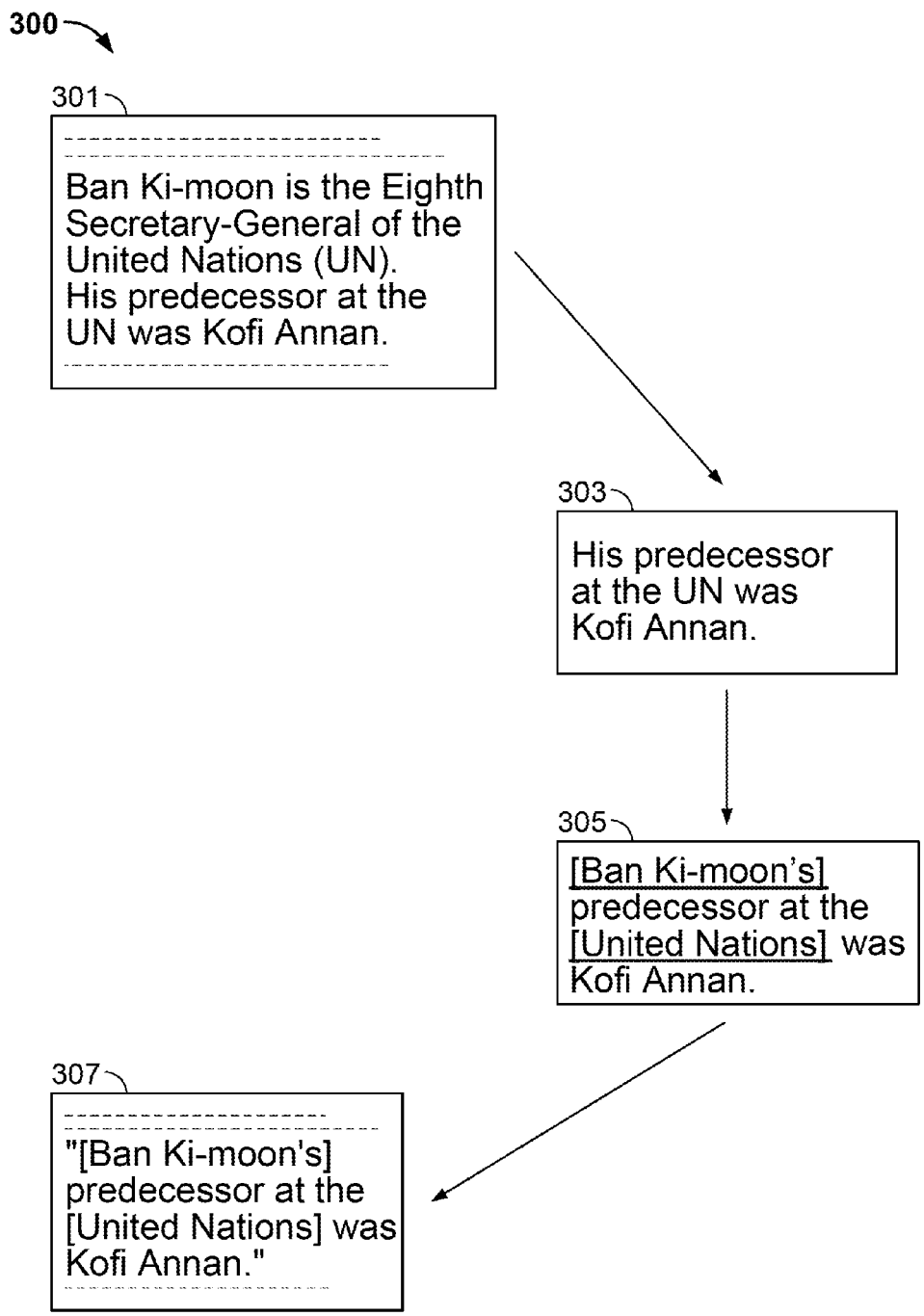
FIG. 3 shows a method of correcting syntax when copying and pasting text in accordance with an implementation as described herein.

Systems and methods are disclosed herein for correcting quotations copied from an electronic document before they are pasted into another document. FIG. 3 shows a method 300 for correcting portion of copied text and pasting the corrected text into another document. Method 300 includes copying a portion of text from an electronic document, collecting annotations associated with the portion of text provided by the electronic document, correcting the copied text based on the annotations, and pasting the corrected text into another electronic document when the paste function is invoked. Method 300 can be performed on a client-server system such as that illustrated in FIG. 1, or may be performed solely on one computing device.

Method 300 starts when a portion of text is copied from electronic document 301. Document 301 can be a word processing document, web page, spreadsheet, presentation, or other similar document. Document 301 may be stored on a server and accessed by one or more client computers. Document 301 contains a portion of text: "Ban Ki-moon is the Eighth Secretary-General of the United Nations. His predecessor at the UN was Kofi Annan." The second sentence in the text contains a pronoun ("His", referring to Ban Ki-moon) and an acronym ("UN", referring to United Nations). The first sentence of the text defines the pronoun and the acronym.

Document 301 also contains annotations associated with various portions of text located within the document. An annotation service, located at either the server computer or client computer, can generate the annotations. The annotation service may be a program implemented in non-transitory computer readable media located on the server computer or client computer. The annotations can be generated when document 301 is created or edited. The annotations may also be generated at the time a user copies portions of text from document 301. The annotations may be stored as metadata in document 301 or may be stored within the annotation service. The annotations provide corrections to portions of text when that portion of text is copied. The annotation can depend on the context of the copied text in relation to the document as a whole. Corrections may include replacing pronouns with nouns, expanding acronyms, rearranging word order and word tense, and other semantic or syntax based corrections. For example, a user on a client computer copies the second sentence of the portion of text: "His predecessor at the UN was Kofi Annan." When the copy function is invoked, the copied text is stored in a buffer or clipboard on the client computer. In FIG. 3, clipboard 303 on the client computer contains the second sentence of the portion of text from document 301 after it has been copied.

Along with the portion of text, document 301 provides annotations for the copied portions of text. For example, the annotations can provide that when the text "His predecessor at the UN was Kofi Annan" is copied, "His" should be changed to "Ban Ki-moon's" and "UN" should be changed to "United Nations." By changing the pronoun into a noun and expanding the acronym, the annotations provide additional context to make the copied portion of text more understandable. The changes made by the annotations to the copied portion of text can be made in the clipboard. Note that if both sentences in document 301 were copied, the second sentence would not need to be annotated because the first sentence contains all the necessary information. The annotation service can analyze the context of the copied text in relation to the entire document to determine if any annotations are necessary.

Clipboard 305 shows the copied portion of text with the changes made by the annotations in underline. The square brackets surrounding "Ban Ki-moon's" and "United Nations" indicate that an edit was made to the quoted text. In cases where text may be added or changed, square brackets surrounding the altered or added text can be used to indicate the edit. In cases where text may be removed, the notation [ . . . ] can be used to indicate that text has been removed. The corrected text can then be pasted into electronic document 307 by the user at the client computer.

In some implementations, a user can be shown the corrected portion of text and can reject or make additional edits to the portion of text. For example, a user can be shown a dialogue window with the clipboard contents and suggested changes, as shown in clipboard 305. The user can then make additional edits, reject all the suggested corrections, or accept the corrections without additional edits. For example, the dialogue window may present editable text that the user can directly edit. The dialogue window may also include buttons for accepting or rejecting the corrections made by the annotations. If the user makes additional edits, the edits can be incorporated into the annotations for that portion of text. Thus if the portion of text is copied again by the same user or by another user, the updated annotations are used to correct that text. In some implementations, document 301 can store multiple annotations for each portion of text. When any user copies a portion of text, that user can select a preferred annotation from a set of annotations.

The annotations for text in an electronic document can be determined and stored in various ways. In a client-server system, the server stores the electronic document (e.g. web page or online word processing document) and can determine and store the annotations for the electronic document before a client views the document. When a user views the electronic document and selects a portion of text from the document for copying, the server can provide the user with one or more annotations for that portion of text. In some implementations, the creation of annotations may also be performed at the client computer. When a client computer views an electronic document, for example a web page, the web browser on the client computer can determine the annotations for the electronic document. For example, the web browser may include an add-on or extension that generates annotations. Annotations may also be determined and stored in other ways, such as through a stand-alone program or applet on either a server or client computer, or other methods.

Figure 4:
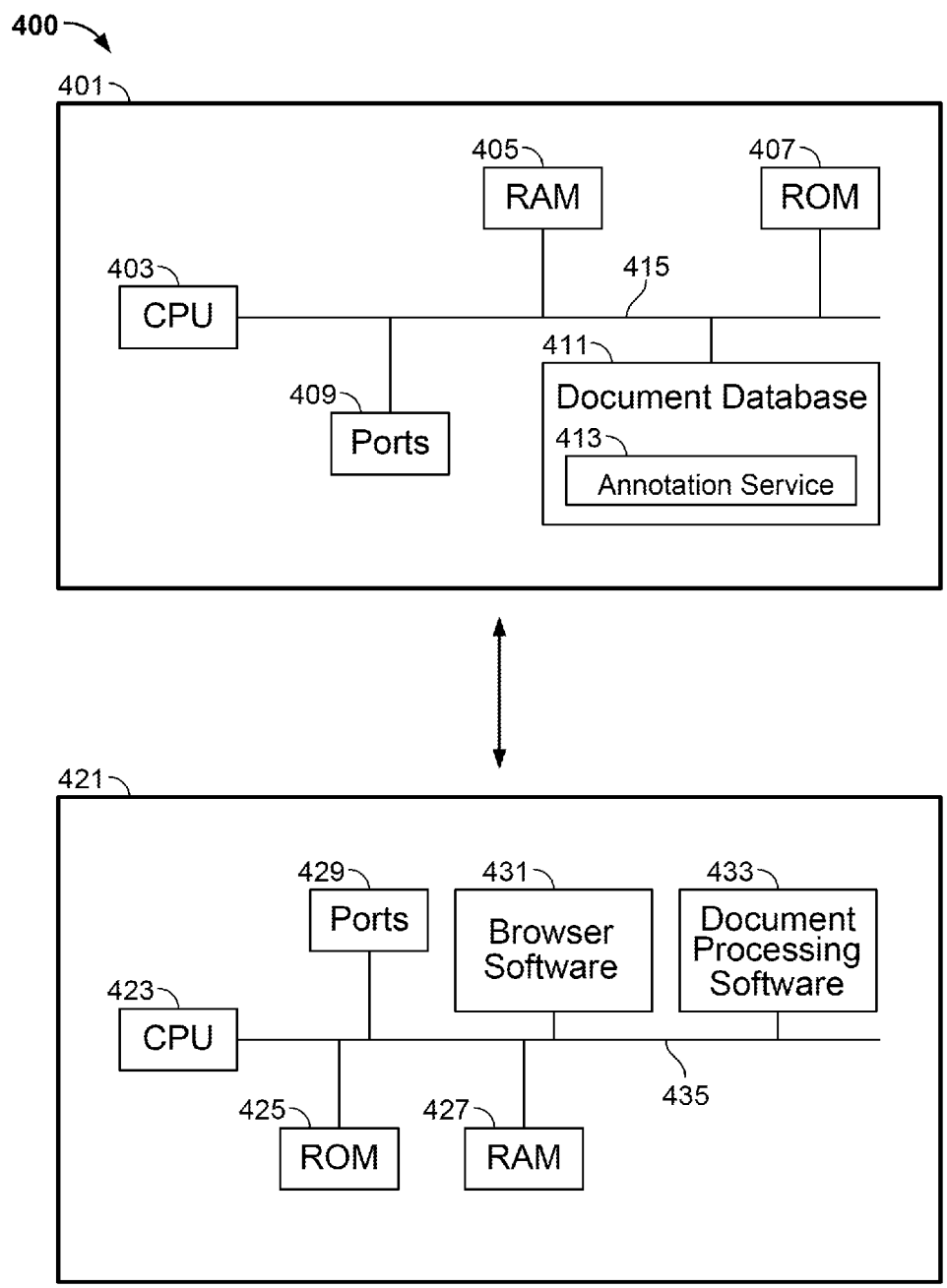
FIG. 4 shows the components of a server and a client in accordance with an implementation as described herein.

FIG. 4 shows an example of a client-server system 400 where the server stores electronic documents and determines annotations which are accessible by a client. Client-server system 400 includes a server computer 401 and a client computer 421. Server computer 401 may provide services to multiple client computers, but for the purposes of FIG. 4 only one client computer is illustrated. Server computer 401 includes a central processing unit (CPU) 403, random access memory (RAM) 405, read only memory (ROM) 407, ports 409, document database 411 and bus 415. Server computer 401 may have additional components that are not illustrated in FIG. 4. Bus 415 allows the components of server computer 401 to communicate with each other. Ports 409 allow the server computer 401 to communicate with other devices, such as client computer 421. Document database 411 stores electronic documents that are accessible by client computer 421. For example, document database 411 can contain web page information that is displayed within a web browser on client computer 421. Document database 411 can also store online electronic documents that client computer 421 can access and edit, like word processing documents, spreadsheets, or presentations. Document database 411 contains an annotation service 413 that generates annotations for the electronic documents stored in document database 411 Annotation service 413 can also store the annotations, or the annotations can be stored in the metadata of the documents in document database 411. The annotations can be determined when the electronic document is saved into document database 411 and can be provided to client computer 421 when the client computer accesses the electronic document or copies a portion of text from the document. Document database 411 and annotation service 413 can be implemented as computer readable code in computer readable media.

Client computer 421 includes CPU 423, RAM 425, ROM 427, ports 429, browser software 431, document processing software 433, and bus 435. Client computer 421 may have additional components not illustrated in FIG. 4. Bus 435 allows the components of client computer 421 to communicate with each other. Ports 429 allow the client computer 421 to communicate with other devices, such as server computer 401. Browser software 431 is used to display web pages, for example from web hosting services provided by server computer 401. Examples of commercially available browser software include but are not in limited to GOOGLE CHROME®, offered by Google Inc. of Mountain View, Calif.; INTERNET EXPLORER®, offered by Microsoft Corporation of Redmond, Wash.; and FIREFOX®, offered by Mozilla Corporation of Mountain View, Calif. Document processing software 433 is software used to display and edit electronic documents, such as word processing documents, spreadsheets, or presentations. Browser software 431 and document processing software 433 can be implemented as computer readable code in computer readable media.

Client computer 421 can view the electronic documents stored on server computer 401. This can be done, for example, through browser software 431 or document processing software 433 on client computer 421. Server computer 401 can provide electronic documents stored in document database 411 to client computer 421 in the form of a web page or other format. Server computer 401 can also provide annotations stored in annotation service 413 or the metadata of the electronic documents to client computer 421. If a user on client computer 421 copies a portion of text from an electronic document stored in server computer 401, the user can be provided with one or more annotations for the portion of text. The user can choose to accept or reject the annotation, or make edits to the annotation, before the portion of text is pasted into another document, such as a document opened with document processing software 433. If the user edits the annotation, the edited annotation can be stored in annotation service 413 or in the metadata of the document from which the text was copied Annotation service 413 can store multiple annotations for the same portion of text and make those annotations available to a group of client computers. In some implementations, browser software 431 or document processing software 433 can include annotation service 413 and thus the client computer 421 determines and stores annotations of electronic documents.

Various aspects of the software described herein, including document database 411, annotation service 413, browser software 431 and document processing software 433, can be implemented as computer executable instructions stored on non-transitory computer readable media. When executed, the computer executable instructions cause a computing device to implement the software described herein. Documents in document database 411 and annotations in annotation service 413 can also be stored on non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

It will be apparent to one of ordinary skill in the art that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of correcting quotations copied from an electronic document, the method comprising:
receiving a selected portion of text that is electronically copied from a first electronic document;

generating a first annotation from the selected portion of text using an annotation service, wherein the generating comprises:
  analyzing an unselected portion of text that precedes the selected portion of text within the first electronic document; and
  identifying a part of the unselected portion of text to replace a part of the selected portion of text;
presenting the first annotation to a first user for approval;
receiving an approval of the first annotation from the first user; and
pasting, in response to a paste command and the approval, a modified version of the selected portion of text into a second electronic document that is different from the first electronic document, wherein the modified version of the selected portion of text is modified according to the first annotation.

2. The method of claim 1, wherein the part of the selected portion of text is a pronoun, and the part of the unselected portion of text is a noun that corresponds to the pronoun.

3. The method of claim 1, wherein the part of the selected portion of text is an acronym, and the part of the unselected portion of text is an expansion of the acronym.

4. The method of claim 1, the method further comprising:
receiving a disapproval of the first annotation from the first user; and
pasting, in response to a paste command and the disapproval, the selected portion of text into a second electronic document without any modification.

5. The method of claim 1, the method further comprising:
receiving edits of the first annotation from the first user; and
pasting, in response to a paste command from the first user, the selected portion of text into a second electronic document based on the edited first annotation.

6. The method of claim 5, the method further comprising:
associating the first annotation with the selected portion of text;
storing the edited first annotation as a second annotation; and
associating the second annotation with the selected portion of text.

7. The method of claim 6, the method further comprising:
determining that the selected portion of text is copied by a second user;
presenting the second user with a choice of using the first annotation or the second annotation associated with the selected portion of text; and
pasting, in response to a paste command from the second user, the selected portion of text into the second electronic document, wherein the pasting includes modifying the selected portion of text based on the second user's choice of the first annotation or second annotation.

8. The method of claim 1, wherein the first electronic document is a web page.

9. A method of annotating an electronic document, the method comprising:
generating a first annotation from a selected portion of text in a first electronic document using an annotation service, wherein the generating comprises:
  analyzing an unselected portion of text that precedes the selected portion of text within the first electronic document; and
  identifying a part of the unselected portion of text to replace a part of the selected portion of text;
storing the first annotation in metadata of the first electronic document;
detecting an electronic copying of the selected portion of text to a copy buffer;
modifying the selected portion of text in the copy buffer according to the first annotation;
presenting the modified selected portion of text in the copy buffer to a first user for approval;
receiving an approval of the modified selected portion of text from the first user; and
pasting, in response to a paste command and the approval, the modified selected portion of text into a second electronic document that is different from the first electronic document.

10. The method of claim 9, wherein the part of the selected portion of text is a pronoun, and the part of the unselected portion of text is a noun that corresponds to the pronoun.

11. The method of claim 9, wherein the part of the selected portion of text is an acronym, and the part of the unselected portion of text is an expansion of the acronym.

12. The method of claim 9, the method further comprising receiving edits of the first annotation from the first user.

13. The method of claim 12, the method further comprising storing the edited first annotation as a second annotation in the metadata of the first electronic document.

14. The method of claim 13, the method further comprising:
determining that the selected portion of text has been electronically copied by a second user;
presenting the second user with a choice of using the first annotation or the second annotation; and
modifying the selected portion of text in the copy buffer according to the second user's choice of the first annotation or second annotation.

15. Apparatus for accessing electronic documents, the apparatus comprising:
a server computer storing a plurality of electronic documents;
a plurality of client computers that can view the plurality of electronic documents stored on the host server and can copy text from the plurality of electronic documents; and
an annotation service, wherein the annotation service generates a first annotation from a selected portion of text within a first electronic document by:
  analyzing an unselected portion of text that precedes the selected portion of text within the first electronic document; and
  identifying a part of the unselected portion of text to replace a part of the selected portion of text; and
  wherein the annotation service makes the first annotation available to a first client computer in the plurality of client computers when the first client computer copies the selected portion of text, and wherein the first annotation is used to generate a modified selected portion of text that is pasted into a second electronic document different from the first electronic document.

16. The apparatus of claim 15, wherein the server computer comprises the annotation service.

17. The apparatus of claim 15, wherein the first client computer comprises the annotation service.

18. The apparatus of claim 15, wherein the annotation service stores a plurality of annotations for the selected portion of text, including the first annotation, and allows a user to choose among the plurality of annotations when the first client computer copies the selected portion of text.

19. The apparatus of claim 15, wherein the plurality of electronic documents comprise web pages.

20. The apparatus of claim 15, wherein the plurality of electronic documents comprise word processing documents.

21. The apparatus of claim 15, wherein the annotation service allows a user to edit the first annotation.

22. A non-transitory computer readable medium storing computer executable instructions, which, when executed by a processor, cause the processor to carry out a method for annotating an electronic document, wherein the instructions comprise:
   instructions to generate a first annotation from a selected portion of text in a first electronic document, wherein the first annotation is generated by:
      analyzing an unselected portion of text that precedes the selected portion of text within the first electronic document; and
      identifying a part of the unselected portion of text to replace a part of the selected portion of text;
   instructions to store the first annotation in metadata of the first electronic document;
   instructions to detect an electronic copying of the selected portion of text to a copy buffer;
   instructions to modify the selected portion of text in the copy buffer according to the first annotation; and
   instructions to paste, in response to a paste command, the modified selected portion of text into a second electronic document that is different from the first electronic document.

23. The non-transitory computer readable medium of claim 22, wherein the part of the selected portion is a pronoun, and the part of the unselected portion is a corresponding noun.

24. The non-transitory computer readable medium of claim 22, wherein the part of the selected portion is an acronym, and the part of the unselected portion is an expansion of the acronym.

25. The non-transitory computer readable medium of claim 22, the instructions further comprising instructions to present the first annotation to a user for approval before modifying the selected portion of text in the copy buffer.

26. The non-transitory computer readable medium of claim 22, the instructions further comprising:
   instructions to generate a second annotation in the first electronic document, wherein the second annotation identifies a second part of the unselected portion of text to replace the part of the selected portion of text;
   instructions to present a user with a choice of using the first annotation or the second annotation; and
   instructions to modify the selected portion of text in the copy buffer according to the user's choice of the first annotation or second annotation.

27. The non-transitory computer readable medium of claim 26, wherein the second annotation is provided by the user.

* * * * *